United States Patent [19]

Ueda

[11] Patent Number: 5,083,146
[45] Date of Patent: Jan. 21, 1992

[54] ZOOM LENS CAMERA

[75] Inventor: Toshiaki Ueda, Saitama, Japan

[73] Assignee: Asahi Kogaku Kogyo Kabushiki Kaisha, Tokyo, Japan

[21] Appl. No.: 588,767

[22] Filed: Sep. 27, 1990

[30] Foreign Application Priority Data

Oct. 2, 1989 [JP] Japan .................. 1-257496
Oct. 4, 1989 [JP] Japan .................. 1-259712

[51] Int. Cl.[5] ............... G03B 15/03; G03B 13/12; G03B 3/00
[52] U.S. Cl. ................... 354/149.1; 354/149.11; 354/195.1; 354/222
[58] Field of Search ......... 354/149.1, 149.11, 195.1, 354/199, 222

[56] References Cited

U.S. PATENT DOCUMENTS 4,914,461 4/1990 Hori ................... 354/149.1
4,916,475 4/1990 Hori ................... 354/149.1 X
4,944,030 7/1990 Haraguchi et al. ...... 354/149.1 X

FOREIGN PATENT DOCUMENTS 8707038 11/1987 World Int. Prop. O. .

Primary Examiner—Michael L. Gellner
Attorney, Agent, or Firm—Sandler, Greenblum, & Bernstein

[57] ABSTRACT

A zoom lens camera including a lens barrel cam ring which rotates about an optical axis of the camera and a photographic lens system having a variable focal length which is varied in accordance with the rotation of the lens barrel cam ring. A finder optical system having a movable optical member which varies the finder field of view and a finder driving ring which is rotatable coaxially to and independently of the lens barrel cam ring are also provided. Further, a finder field of view varying mechanism, which moves the movable optical member of the finder optical system, is association with the rotation of the finder driving ring, to vary the finder field of view, and a reduction gear mechanism, which reduces the number of revolutions of the lens barrel cam ring and transmits the reduced rotation to the finder driving ring are provided.

13 Claims, 5 Drawing Sheets

Fig 5C
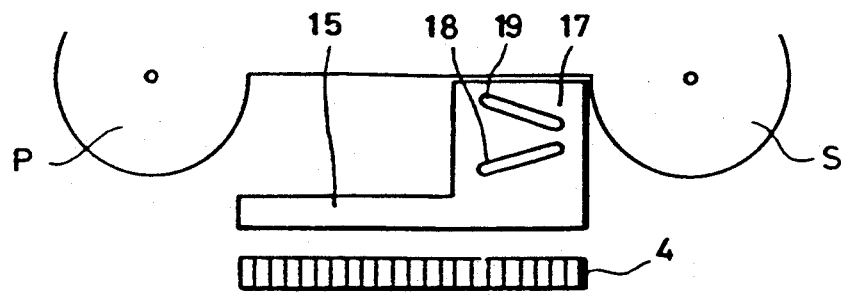
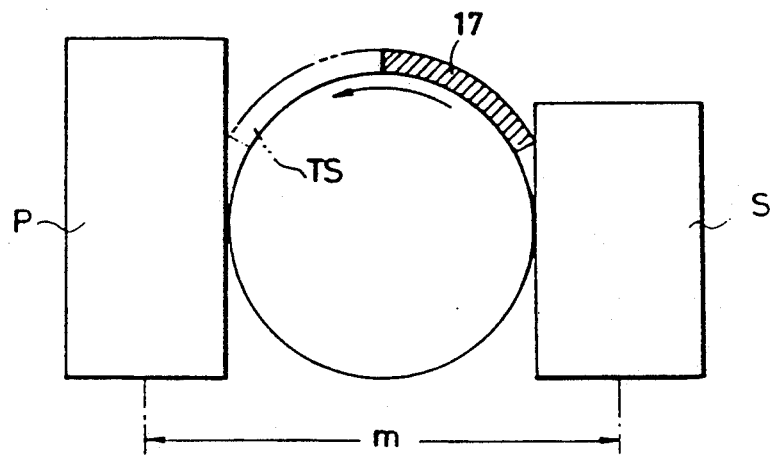
Fig. 5A
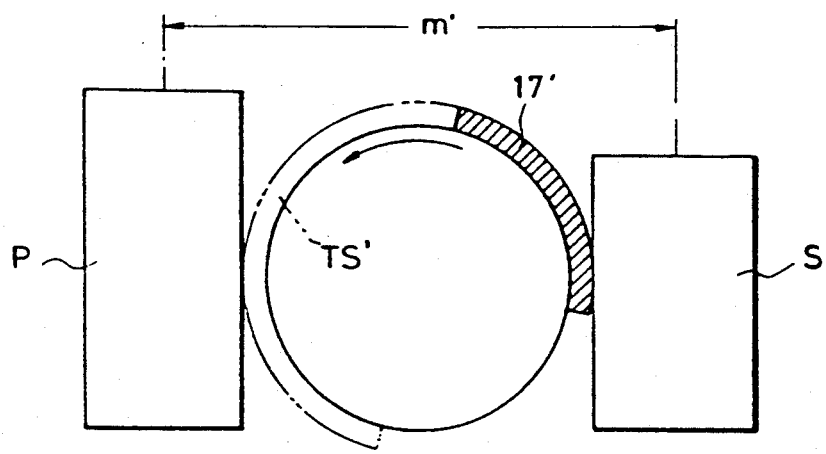
Fig. 5B

ZOOM LENS CAMERA

BACKGROUND OF THE INVENTION

1. Field of the Invention

The present invention relates to a camera having a lens the focal length of which can be changed. More precisely, the invention relates to a zoom lens camera in which the finder field of view and/or the strobe illuminating angle can be varied in association with the change in lens focal length.

2. Description of Related Art

In a zoom lens camera (or a multifocus camera) having a photographing lens system and a finder optical system separate therefrom, a lens barrel cam ring which can rotate about an optical axis is rotated to move a movable lens of the zoom photographing lens system to change the focal length thereof. A movable lens of the finder optical system is moved in the optical axis direction in accordance with the rotation of the lens barrel cam ring, between the wide angle mode, the telephoto mode or the macro mode. Thus, a finder field of view corresponding to the photographic angle field of view and or a change of the strobe illuminating angle can be obtained.

The assignee of the present application has proposed a zoom lens camera having a finder device, in which a planar cam is provided to move in association with the rotation of the lens barrel cam ring. The planar cam has cam grooves in which driven pins, provided on frames of a plurality of movable lenses of the finder device, and a driven pin, provided on an illuminating angle varying member of the strobe device, are fitted, so that the finder optical system and the strobe device can be made to correspond with the movement of the zoom lens system.

However, the planar cam which moves in the lateral direction of the camera requires a large space for movement. This is contrary to the realization of a compact and small camera. Furthermore, since both the finder optical system and the strobe device are driven by the single planar cam, the finder optical system and the strobe device must be positioned close to each other, resulting in less flexibility in design of the camera.

SUMMARY OF THE INVENTION

The primary object of the present invention is to provide a smaller and more compact zoom lens camera in which the cam mechanism, similar to that of a conventional camera, is used.

Another object of the present invention is to provide a zoom lens camera in which the finder optical system and the strobe device can be placed spaced an optional distance from each thus.

To achieve the object mentioned above, the basic concept of the present invention is directed to the provision of a driving ring which rotates about an optical axis to drive the zoom finder device and/or the zoom strobe device, in addition to the lens barrel cam ring for driving the zoom photographing lens system.

In the present invention, a finder driving ring which rotates around the optical axis is provided, in addition to the lens barrel cam ring for varying the focal length of the photographic optical system. Also, a reduction gear mechanism is provided which reduces the rotation of the lens barrel cam ring and transmits the reduced rotation to the finder driving ring. The movable lens or lenses (movable optical member) of the finder device having a variable field of view is or are moved in accordance with the rotation of the finder driving ring to vary the finder field of view.

According to the present invention, a zoom lens camera is provided having a lens barrel cam ring which rotates about an optical axis of the camera. The camera includes a photographic lens system having a variable focal length, which is varied in accordance with the rotation of the lens barrel cam ring and a finder optical system having a movable optical member which varies the finder field of view. Further, a finder driving ring which is rotatable coaxially to and independently of the lens barrel cam ring and a finder field of view varying mechanism which moves the movable optical member of the finder optical system in association with the rotation of the finder driving ring to vary the finder field of view are provided reduction gear mechanism which reduces the number of revolutions of the lens barrel cam ring and transmits the reduced rotation to the finder driving ring is provided.

With this arrangement, the finder is driven by the finder driving ring which rotates about the optical axis, resulting in a more efficient utilization of the space in the camera. Furthermore, since the finder driving ring rotates through the reduction gear mechanism independently of the lens barrel cam ring, the finder can be driven by the angular displacement of the finder driving ring which is less than that of the lens barrel cam ring.

The rotation of the reduction gear mechanism can be transmitted to the light emitting tube (illuminating angle varying member) of the zoom strobe device independently of the zoom finder device. Consequently, the zoom strobe device can be freely positioned, independently of the zoom finder device.

BRIEF DESCRIPTION OF DRAWINGS

The invention will be described below in detail with reference to the accompanying drawings, in which:

FIG. 5C is a schematic top view of a portion of the camera of the present invention showing the location of the drive ring with respect to the spool and patrone chambers.

DESCRIPTION OF PREFERRED EMBODIMENTS

Figure 4:
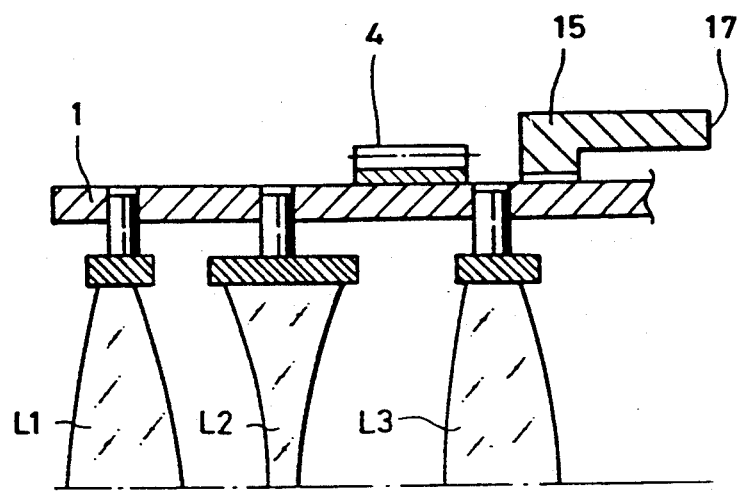
FIG. 4 is a sectional view of a lens barrel cam ring and a finder driving ring, according to the present invention; and, FIGS. 5A and 5B are schematic frontal elevational views explaining the technical effect of the present invention.

Lens groups L1~L3 (FIG. 4). which constitute a zoom lens photographing system, are moved in the optical axis direction when a lens barrel cam ring 1 rotates about the optical axis. The mechanism for moving the lens groups by the lens barrel cam ring is per se known. The lens barrel cam ring 1 is provided on its outer peripheral surface with a lens barrel gear 4 integral therewith, which is operatively connected to a zoom motor 5 through a reduction gear device 6 to reduce the number of revolutions of the zoom motor 5.

A finder driving ring/gear 15 which is rotatable about the optical axis independently of the lens barrel cam ring 1 is located on the outer periphery of the lens barrel cam ring 1. The finder driving ring 15 is provided on its outer peripheral surface with a gear 16 which is in mesh with the lens barrel gear 4 through a reduction gear device 20.

The reduction gear device 20 has a first gear train consisting of a first gear 21, intermediate gears 22 and 31, and a first terminal gear 32, and a second gear train consisting of the first gear 21, the intermediate gear 22 and a second terminal gear 23. The first gear 21 is in mesh with the lens barrel gear 4, and the second terminal gear 23 is in mesh with the gear 16, respectively. The ring/gear 16 can be either a ring gear which extends along the whole circumference of the finder driving gear 15 or a sector ring/gear which extends along a part of the circumference of the finder driving gear 15.

The zoom finder device 2 has first and second lenses 7 and 8 which are supported on a finder device (not shown) to move in a direction parallel with the optical axis L and which are movable optical members for varying the finder field of view, and third and fourth lenses 9 and 10 secured to the finder body. First and second holders 11 and 12 of the first and second lenses 7 and 8 are provided on their lower portion with driven pins 13 and 14, respectively.

The finder driving ring/gear 15 a cam plate portion 17 having an arched cross section and projecting rearwardly in the direction of the optical axis L. The cam plate portion 17 has two cam grooves 18 and 19 in which the driven pins 13 and 14 of the first and second lenses 7 and 8 are fitted, respectively. The cam profiles of the cam grooves 18 and 19 are such that the positions of the first and second lenses 7 and 8 are varied to correspond the field of view of the finder device 2 to the photographic angle of view of the zoom photographing lens system.

The zoom strobe device 3 is supported on the camera body so as to move a light emitting unit (illuminating angle varying member) 26 in the direction parallel with the optical axis L. The light emitting unit 26 has a light emitting tube (xenon tube) 27 and a reflecting shade, and also has a projecting driven pin 28 on the lower portion thereof. The light emitting unit 26 is biased in the forward direction by a spring 29. The movement of the light emitting unit 26 relative to a known condenser lens (Fresnel lens) changes the strobe illuminating angle.

The first terminal gear 32 of the reduction gear device 20 has a three-dimensional cam 33 integral therewith, having a cam surface 34 against which the driven pin 28 of the light emitting unit 26 bears. The shape of the cam surface 34 is such that the light emitting unit 26 is moved to correspond the illuminating angle of the strobe device 3 to the focal length of the zoom photographic lens system.

The zoom lens camera of the present invention as constructed above operates as follows.

When the zoom motor 5 rotates, the lens barrel cam ring 1 rotates through the reduction gear device 6 and the lens barrel gear 4 to vary the focal length of the zoom photographic lens system. In the drawings, "W" designates the wide angle direction and "T" the telephoto direction.

When the lens barrel gear 4 rotates, the finder driving ring/gear 15 simultaneously rotates through the reduction gear device 20. As a result, the cam grooves 18 and 19 of the cam plate portion 17 of the driving ring 15 rotate and change their positions. The rotation of the lens barrel gear 4 is transmitted to the first terminal gear 32 of the finder driving reduction gear device, so that the three-dimensional cam 33 rotates together with the first terminal gear 32.

For example, when the lens barrel cam ring 1 rotates in the direction from W (Wide) to T (Telephoto), as shown by an arrow, the cam plate portion 17 of the finder driving ring 15 rotates in the same direction from W to T. As a result, the first and second driven pins 13 and 14 of the first and second lenses 7 and 8 which are fitted in the cam grooves 18 and 19 are moved in the optical axis direction L in accordance with the cam profiles thereof to obtain a finder field of view corresponding to the focal length of the zoom lens (the angle of view of the photographic zoom lens system).

The driven pin 28 of the light emitting unit 26 is moved in the optical axis direction L by the biasing force of the spring 29, in accordance with the shape of the cam surface 34 of the three-dimensional cam 33, while being guided by the cam surface 34. Consequently, the illuminating angle of the zoom strobe device 3 is varied in accordance with the focal length of the photographic zoom lens.

In the operation mentioned above, the angular displacement of the finder driving ring/gear 15, which rotates independently of the lens barrel cam ring 1, is smaller than that of the lens barrel cam ring 1 due to the reduction gear mechanism 20. Therefore, the displacement of the cam plate portion 17 is decreased, resulting in a decreased space necessary for the movement thereof.

This will be described in more detail below with reference to FIGS. 5A, 5B, and 5C. If the cam grooves 18 and 19 were in the lens barrel cam ring 1 rather than the finder driving ring 15, since the lens barrel cam ring 1 usually rotates more than 180 the space TS' necessary for retracting and receiving the cam plate portion 17' must be made large, as shown in FIG. 5B. This leads to an increased distance m' between a spool chamber S and a patrone or cassette chamber P (FIG. 5B).

Conversely in the present invention, since the cam grooves 18 and 19 are formed in the finder driving ring 15 which rotates at a lower speed than the lens barrel cam ring 1 due to the reduction gear device and independently therefrom, the space TS for the cam plate portion 17 can be made smaller than FIG. 5B, as shown in FIG. 5A. This results in a decreased distance m between the spool chamber S and the patrone chamber P.

Figure 1:
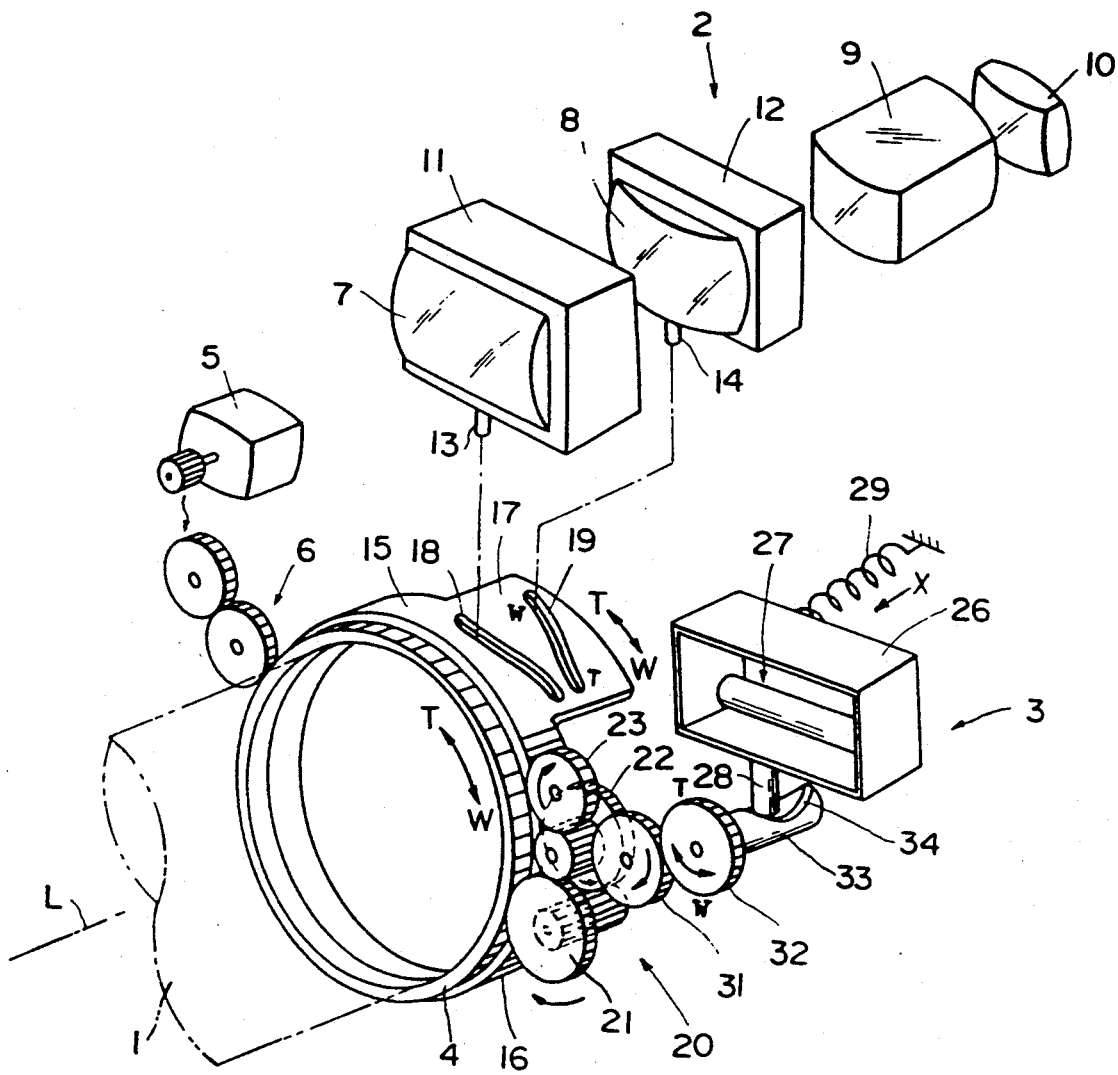
FIGS. 1, 2 and 3 are exploded perspective views of three different embodiments of a main part of a zoom lens camera according to the present invention.
Figure 2:
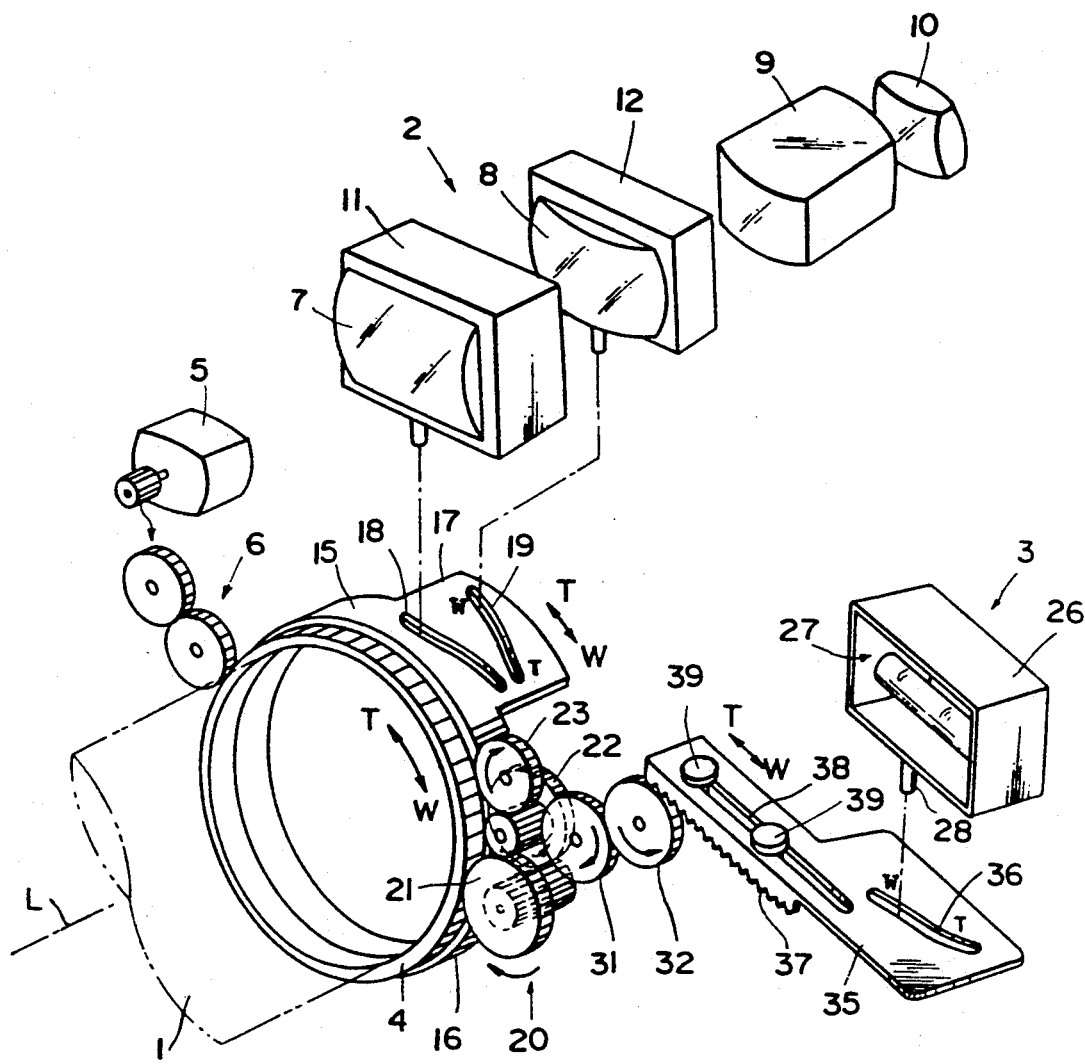

FIG. 2 shows a second embodiment of the present invention. In FIG. 2, the first terminal gear 32 and the three-dimensional cam 33 in FIG. 1 is replaced with a slide cam plate 35. The slide cam plate 35 extends in the lateral direction of the camera and has a cam groove 36 and a rack 37 which extends in the lateral direction. The rack 37 engages with the first terminal gear 32 to transmit the rotation of the finder driving ring 15 through the reduction gear device 20, so that when the finder driving ring 15 rotates, the slide cam plate 35 moves linearly in the lateral direction. The cam plate 35 has an elongated hole 38 which extends in parallel with the rack 37. The direction of the movement of the slide cam plate 35 is restricted by holding pins 39 fitted in the elongated hole 38 and secured to the camera body. The other construction of the second embodiment shown in FIG. 2 is the same as that of the first embodiment shown in FIG. 1.

In the second embodiment, illustrated in FIG. 2, the rotation of the lens barrel gear 4 is transmitted to the slide cam plate 35 through the first terminal gear 32 of the reduction gear device 20 and the rack 37. Namely, the slide cam Plate 35 moves in the lateral direction, so that the cam groove 36 changes its position. As a result, the driven pin 28, and accordingly, the light emitting unit 26 move along the profile of the cam groove 36 to vary the illuminating angle in accordance with the focal length of the zoom photographic lens system.

Figure 3:
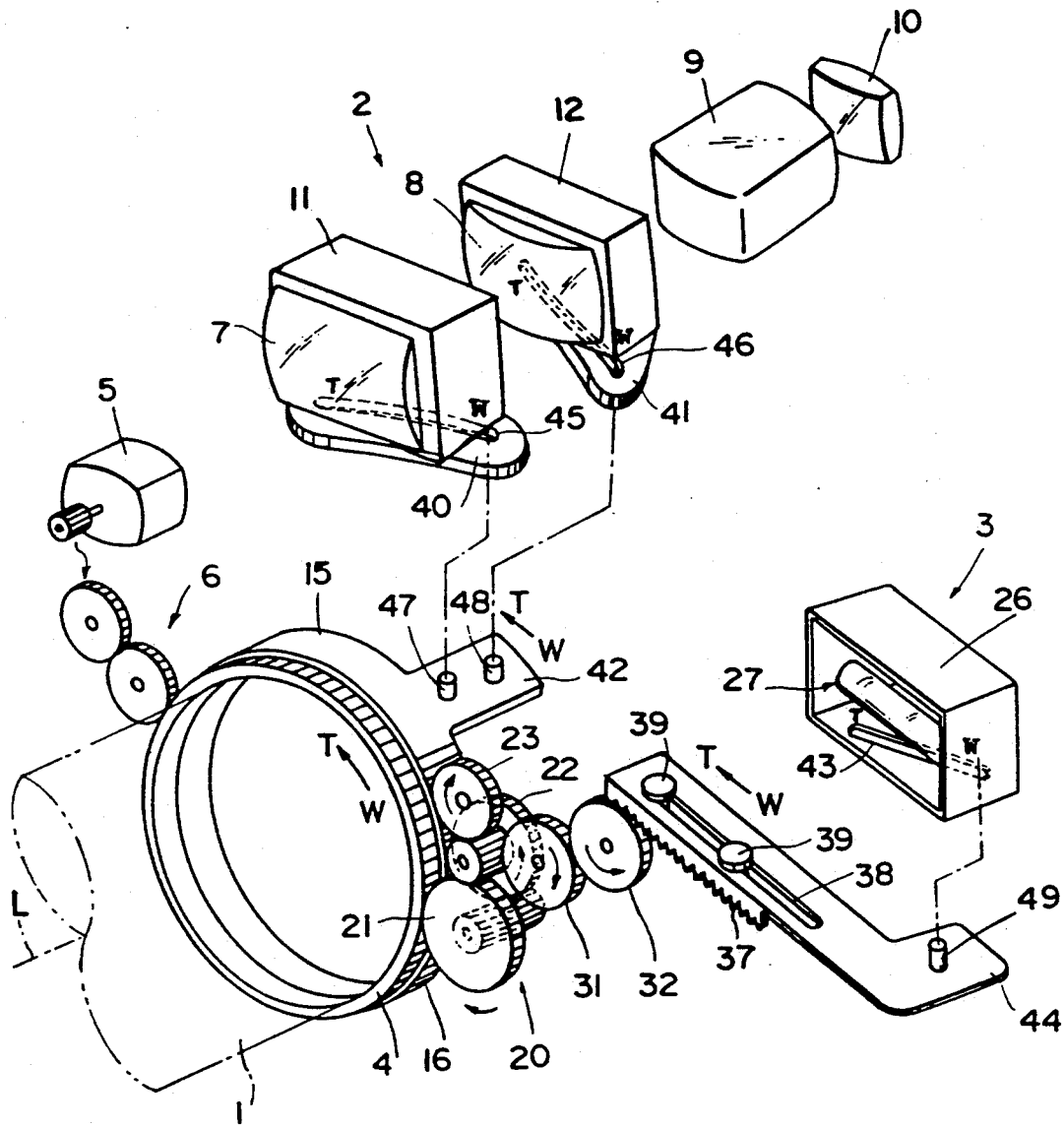

FIG. 3 shows a third embodiment of the present invention. In FIG. 3, the strobe driving cam plate (slide cam plate) 35 in FIG. 2 is replaced with a slide plate 44, and the light emitting unit 26 is provided on its lower surface with a cam groove 43. The slide plate 44 has an upwardly projecting drive pin 49 in place of the cam groove 36 in FIG. 2. The drive pin 49 is fitted in the cam groove 43 of the light emitting unit 26. The first and second lens holders 11 and 12 of the first and second lenses 7 and 8 have cam plates 40 and 41 having cam grooves 45 and 46, respectively. The finder driving ring 15 has a pin support 42 on which drive pins 47 and 48 are formed to be fitted in the cam grooves 45 and 46, respectively.

In the third embodiment, the pins constitute the drive components and the cam grooves constitute the driven components, contrary to the second embodiment. The other construction of the third embodiment illustrated in FIG. 3 is the same as that of the second embodiment shown in FIG. 2.

In FIG. 3, the components corresponding to those in FIG. 2 are designated with the same reference numerals as those in FIG. 2.

I claim:

1. A zoom lens camera comprising:
   a lens barrel cam ring which rotates about an optical axis of the camera;
   a photographic lens system having a variable focal length which is varied in accordance with the rotation of said lens barrel cam ring;
   a finder optical system having at least one movable optical member which varies the finder field of view;
   a finder driving ring which is rotatable coaxially to and independently of said finder optical system in association with the rotation of said finder driving ring to vary the finder field of view; and
   a reduction gear mechanism which reduces rotation of said lens barrel cam ring and transmits the reduced rotation to said finder driving ring.

2. A zoom lens camera according to claim 1, wherein said finder field of view varying mechanism comprises a cam plate portion projecting from said finder driving ring, at least one cam groove formed on said finder optical system to said movable optical member of said finder optical system to be fitted in said cam groove of said cam plate portion.

3. A zoom lens camera according to claim 2, further comprising a spool chamber and a patrone chamber each of which are located at opposite sides of said finder driving ring as viewed from the front of the camera so that said cam plate portion extends between said spool chamber and said patrone chamber.

4. A zoom lens camera according to claim 3, wherein the rotation angle of said cam plate portion is defined by said spool chamber and said patrone chamber.

5. A zoom lens camera according to claim 1, wherein said finder field of view varying mechanism comprises a pin support projecting from said finder driving ring, at least one drive pin provided on said pin support, and at least one cam groove formed in said movable optical member of said finder optical system, so that said drive pin is fitted in said cam groove.

6. A zoom lens camera according to claim 1, further comprising a strobe device having a movable illuminating angle varying member for varying the illuminating angle of said strobe device, and an illuminating angle varying mechanism which moves said movable illuminating angle varying member of said strobe device in association with the rotation of said lens barrel cam ring.

7. A zoom lens camera according to claim 6, wherein said illuminating angle varying mechanism comprises a reduction gear train which is connected to said lens barrel cam ring to be rotated by said lens barrel cam ring, a three-dimensional cam provided on a terminal gear of said reduction gear train, and at least one driven pin provided on said movable illuminating angle varying member to engage said three-dimensional cam.

8. A zoom lens camera according to claim 6, wherein said illuminating angle varying mechanism comprises a reduction gear train which is connected to said lens barrel cam ring to be rotated by said lens barrel cam ring, a slide cam plate reciprocally moved by said reduction gear train, at least one driven pin provided on said movable illuminating angle varying member, and at least one cam groove formed on said slide cam plate, so that said driven pin of said movable illuminating angle varying member is fitted in said cam groove of said slide cam plate.

9. A zoom lens according to claim 6, wherein said illuminating angle varying mechanism comprises a reduction gear train which is connected to said lens barrel cam ring to be rotated by said lens barrel cam ring, a slide plate reciprocally moved by said reduction gear train, at least one drive pin which is provided on said slide plate, and at least one cam groove formed on said movable illuminating angle varying member, so that said drive pin of said slide plate is fitted in said cam groove of said movable illuminating angle varying member.

10. A zoom lens camera comprising:
    a lens barrel cam ring which rotates about an optical axis of the camera;
    a photographic lens system having a variable focal length which is varied in accordance with the rotation of said lens barrel cam ring;
    a strobe device having at least one movable illuminating angle varying member for varying the illuminating angle of the strobe device;
    a reduction gear train which is driven in association with the rotation of said lens barrel cam ring; and
    an illuminating angle varying mechanism which moves said movable illuminating angle varying member of said strobe device in association with the rotation of said reduction gear train, wherein said illuminating angle varying mechanism comprises a three-dimensional cam which is provided on a terminal gear of said reduction gear train, and at least one driven pin provided on said movable illuminating angle varying member to engage said three-dimensional cam.

11. A zoom lens camera comprising:
    a lens barrel cam ring which rotates about an optical axis of the camera;
    a photographic lens system having a variable focal length which is varied in accordance with the rotation of said lens barrel cam ring;

a finder optical system having at least one movable optical member which varies the finder field of view;

a finder driving ring having a cam plate portion which is rotatable coaxially to and independently of said lens barrel cam ring, and which operates said finder optical system in accordance with the rotation of said finder drive ring; and, a spool chamber and a patrone chamber which are located at the opposite sides of the camera as viewed from the front of the camera so that said cam plate portion is extends between said spool chamber and said patrone chamber.

12. A zoom lens camera according to claim 11, wherein the rotation angle of said cam plate portion is defined by said spool chamber and said patrone chamber.

13. A zoom lens camera comprising:

a lens barrel cam ring which rotates about an optical axis of the camera;

a zoom photographic lens system having a variable focal length which is varied in accordance with the rotation of said lens barrel cam ring;

a driving ring which is rotated coaxially to and independently of said lens barrel cam ring;

a reduction gear mechanism which reduces the rotation of said lens barrel cam ring, and transmits the reduced rotation to said driving ring; and, a zoom finder device which is driven by the reduced rotation of said driving ring and which varies the field of view of said zoom finder device in accordance with the angle of view of said zoom photographic lens system.

* * * * *

UNITED STATES PATENT AND TRADEMARK OFFICE
CERTIFICATE OF CORRECTION

PATENT NO. : 5,083,146
DATED : January 21, 1992
INVENTOR(S) : T. UEDA

It is certified that error appears in the above-indentified patent and that said Letters Patent is hereby corrected as shown below:

At column 7, line 12 (claim 11, line 18) of the printed patent, after "portion" delete "is".

Signed and Sealed this

Third Day of December, 1996

Attest:

BRUCE LEHMAN

*Attesting Officer*    *Commissioner of Patents and Trademarks*